United States Patent [19]
Holt

[11] 3,853,890
[45] Dec. 10, 1974

[54] AZINE DERIVATIVES OF PIPERIDINE
[75] Inventor: Brian Holt, Royton, England
[73] Assignee: Ciba-Geigy Corporation, Ardsley, N.Y.
[22] Filed: Sept. 17, 1971
[21] Appl. No.: 181,568

[30] Foreign Application Priority Data
Sept. 19, 1970 Great Britain .................... 44759/70

[52] U.S. Cl.... 260/293.63, 260/45.8 N, 260/293.64
[51] Int. Cl. ............................................. C07d 29/26
[58] Field of Search .................. 260/293.63

[56] References Cited
UNITED STATES PATENTS
3,322,774   5/1967   Jucker et al. ....................... 260/293

Primary Examiner—G. Thomas Todd

[57] ABSTRACT

New azine derivatives of piperidine are stabilizers for organic materials. They are produced by reacting the corresponding piperidones with hydrazine hydrate.

4 Claims, No Drawings

AZINE DERIVATIVES OF PIPERIDINE

DETAILED DESCRIPTION

The present invention relates to new chemical compounds and, in particular, to new azine derivatives of piperidine and to compositions containing these compounds as stabilisers.

According to the present invention, there is provided a compound having the formula:

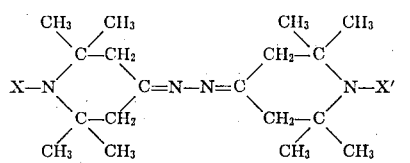

wherein X and $X^1$ are the same or different and X represent OH, NO, alkyl having 1 to 4 carbon atoms, hydroxyalkyl having 1 to 4 carbon atoms, alkoxymethyl having from 1 to 4 carbon atoms in the alkoxy moiety, cyanoalkyl having 2 to 4 carbon atoms, aralkyl having from 7 to 12 carbon atoms, an acyl group having from 1 to 12 carbon atoms, or the group alkyl—NHCO— in which the alkyl residue contains 1 to 4 carbon atoms, and $X^1$ represents H, OH, NO, alkyl having 2 to 4 carbon atoms, hydroxyalkyl having 1 to 4 carbon atoms, alkoxymethyl having from 1 to 4 carbon atoms in the alkoxy moiety, cyanoalkyl having 2 to 4 carbon atoms, aralkyl having from 7 to 12 carbon atoms, an acyl group having from 1 to 12 carbon atoms or the group alkyl-NHCO— in which the alkyl residue contains from 1 to 4 carbon atoms.

The present invention also provides a first process in which a compound of formula I is produced comprising reacting a ketone of formula:

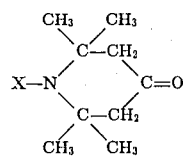

wherein X has its previous significance and a ketone of formula:

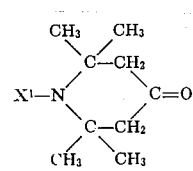

wherein $X^1$ has its previous significance with hydrate. Preferably in this process $X = X^1$ so that the ketones of formulae II and III are identical.

The present invention further provides a second process in which a compound of formula I is produced comprising reacting the azine having the formula:

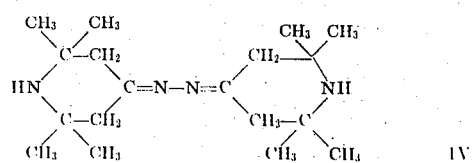

with nitrous acid, ethylene oxide, acrylonitrile, an alkyl or aralkyl halide, an alkyl isocyanate, an alcohol/formaldehyde mixture or an acyl halide respectively. In this way, a compound of formula I is produced in which X and $X^1$ are each NO, $CH_2CH_2OH$, $CH_2CH_2CN$, alkyl, aralkyl, an alkyl-NHCO alkoxymethyl or acyl groups respectively.

Still further, the present invention provides a third process in which a specific compound falling within formula I, namely the compound in which $X = X^1 = OH$ is produced by hydrogenation of the compound of formula I in which $X' = X' = O$.

In the compounds of formulae I, II or III, when on or both the substituent groups X and $X^1$ are alkyl having from 2 to 4 carbon atoms respectively, these groups are preferably ethyl, n-propyl, isopropyl, n-butyl or isobutyl groups. When one or both of X and $X^1$ are hydroxyalkyl having from 1 to 4 carbon atoms, they are preferably hydroxyethyl, hydroxypropyl or hydroxybutyl groups. Examples of preferred alkoxy methyl groups falling under the definition of one or both of X and $X^1$ are methoxymethyl, ethoxymethyl and butoxymethyl groups. Preferred cyanoalkyl groups falling under the definition of one or both of X and $X^1$ are cyanomethyl and cyanoethyl groups. When one or both of X and $X^1$ are aralkyl radicals they are preferably benzyl radicals. When one or both of X and $X^1$ are acyl radicals, preferred examples of such substituents are formyl, acetyl, propionyl and benzoyl groups.

Specific examples of preferred compounds of formula I include:

1-Hydroxy-2,2,6,6-tetramethylpiperidone azine-4
1-Nitroso-2,2,6,6-tetramethylpiperidone azine-4
1-Ethyl-2,2,6,6-tetramethylpiperidone azine-4
1-n-Butyl-2,2,6,6-tetramethylpiperidone azine-4
1-Benzyl-2,2,6,6-tetramethylpiperidone azine-4
1-β-cyanoethyl-2,2,6,6-tetramethylpiperidone azine-4
1-Acetyl-2-2,6,6-tetramethylpiperidone azine-4
1-Ethoxymethyl-2,2,6,6-tetramethylpiperidone azine-4
1-βhydroxyethyl-2,2,6,6-tetramethylpiperidone azine-4
2,2,6,6-tetramethylpiperidone azine-4-monoethyl-1
2,2,6,6-tetramethylpiperidone azine-4-monohydroxy-1
2,2,6,6-tetramethylpiperidone azine-4-mono-β-cyanoethyl-1
2,2,6,6-tetramethylpiperidone azine-4-monoacetyl-1

The various processes of the invention may be conveniently effected by methods well known per se.

The ketone starting-materials of formula II and III may be produced, for example, according to the reactions illustrated in the following reaction scheme:

Specific synthetic polymers include polyvinyl chloride and vinyl chloride co-polymers, such as polyvinyl acetate as well as condensation polymers derived from

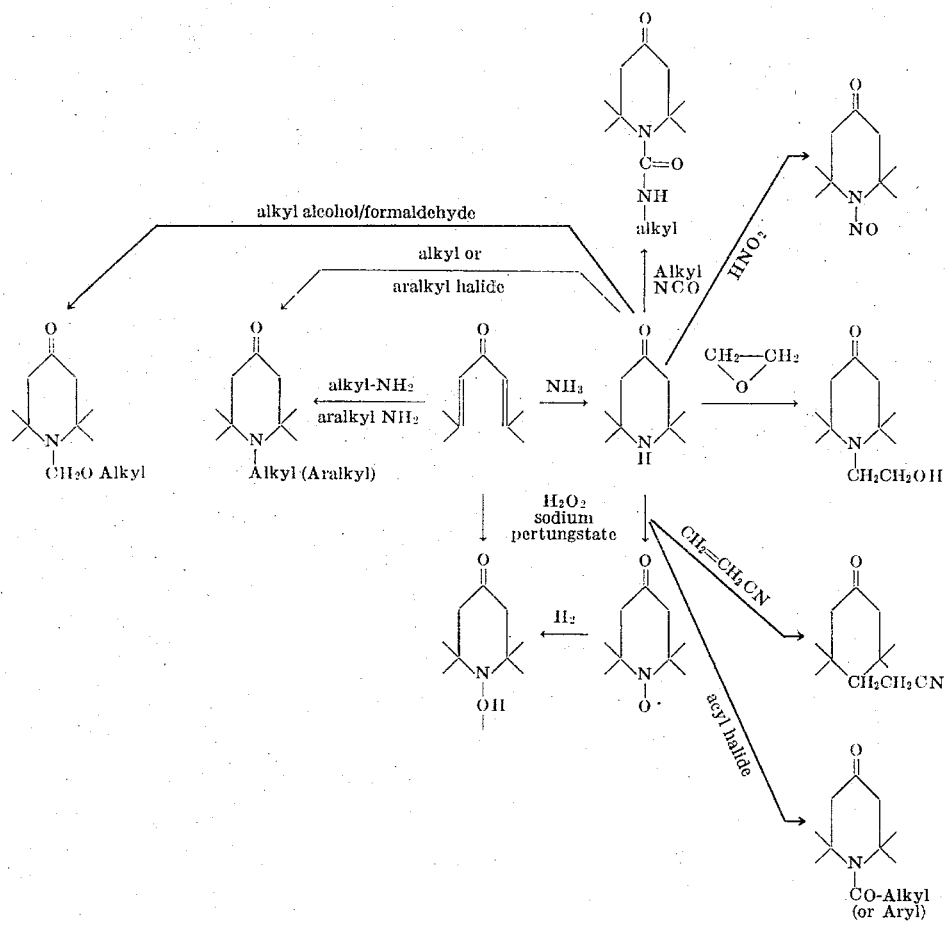

Preparation of ketone starting-materials of formulae II and III

According to the present invention, there is also provided a composition comprising an organic material and a minor proportion of a compound of formula I as hereinbefore defined.

Compounds of formula I have been found to impart to polyolefines an exceptionally high degree of stability against deterioration normally induced by the effects of ultra-violet radiation. Moreover, this stability to light is achieved without affecting the colour properties of the polyolefine treated. The stabilisers of the invention provide effective light stabilisation especially for low- and high-density polyethylene and polypropylene, as well as polymers of butene-1, pentene-1, 3-methylbutene-1, hexene-1, 4-methylpentene-1, 4-methylhexene-1, 4,4-dimethylpentene-1, as well as co- and terpolymers of olefines, particularly of ethylene or propylene.

Other organic materials susceptible to degradation by the effects of light and the properties of which are improved by the incorporation therein of a compound of formula I include natural, and synthetic polymeric materials, for instance natural and synthetic rubbers, the latter include, for example homo-, co- and terpolymers of acrylonitrile, butadiene and styrene.

ether, ester (ex carboxylic, sulphonic or carbonic acids), amide or urethane groupings. These polymers can, for instance, form the basis of surface coating media such as paints and lacquers having an oil or resin, for instance an alkyd or polyamide resin, base.

The amount of the compound of formula I which is incorporated into the organic material in order to achieve maximal protection against degradation by light varies according to the properties of the organic material treated and according to the severity of the light radiation and of the length of exposure. However, for most purposes it is sufficient to use an amount of the compound of formula I within the range of from 0.01 to 5% by weight, more preferably within the range of from 0.1 to 2% by weight based on the weight of untreated organic material.

Optionally, the composition of the invention may contain further additives, especially those used in polyolefine formulations, such as antioxidants, further light stabilisers, metal complexants/deactivators, pigments, anti-slipping and anti-static agents, fillers, dyes, and glass or other fibres.

The compound of formula I may be incorporated into the polymeric material by any of the known techniques for compounding additives with a polymer. For example, the compound of formula I and the polymer may be compounded in an internal mixer. Alternatively, the compound of formula I may be added as a solution or slurry in a suitable solvent or dispersant, for instance an inert organic solvent such as methanol, ethanol or acetone to powdered polymer and the whole mixed intimately in a mixer, and the solvent subsequently removed. As a further alternative the compound of formula I may be added to the polymer during the preparation of the latter, for instance at the latex stage of polymer production, to provide pre-stabilised polymer material.

Examples of suitable antioxidants are those of the hindered phenol type such as 2,6-di-tertiarybutyl-p-cresol, 4,4'-bis(2,6-di-tertiarybutyl-p-cresol, 4,4'-bis(2,6-diisopropylphenol), 2,4,6-triisopropyl phenol, and 2,2'-thio-bis(4-methyl-5-tertiarybutylphenol) tetrakis [methylene-3(3',5'-dibutyl-4'-hydroxyphenyl) propionate] methane; esters of thio-dipropionic acid, for example dilauryl thiodipropionate; alkyl, aryl or alkaryl phosphites such as triphenyl phosphite, trinonyl phosphite and diphenyldecyl phosphite, and combinations of these antioxidants.

Further light stabilisers include those of the substituted benzotriazole class such as 2-(2'-hydroxy-5'-methyl) phenylbenzotriazole, 2-(2'-hydroxy-3,5-di-t-butyl)-5-chloro benzotriazole, those of the hydroxy benzophenone type, hindered phenols such as 2',4'-di-t-butylphenyl-3,5-di-t-butyl-4-hydroxy benzoate and the stabilisers described in our copending British Patent Application Nos. 18090/70 and 28063/70. Suitable metal complexants/deactivators include salicylidene-propylene diamine, 5,5'-methylene-bis-benzotriazole and salts of salicyalaminoquanidine.

As with the compound of formula I, any further additive is advantageously employed in a proportion within the range of from 0.01 to 5% by weight, based on the weight of untreated organic materials.

In combination with an antioxidant suitable for use in inhibiting oxidative deterioration of polyolefines, for instance those of the hindered phenol type, the compounds of formula I provide extremely effective all round stabilising packages for polyolefines, especially polypropylene.

The following Examples further illustrate the present invention. Parts and percentages shown therein are by weight unless otherwise stated.

EXAMPLE 1

A mixture of 9.2 parts of 1-nitroso-2,2,6,6-tetramethyl piperidone-4, 1.25 parts of hydrazine hydrate and 1 part of ethanol was heated on a steam bath for 4 hours. The resulting solid product was recrystallised from ethanol and dried under vacuum to give 2.8 parts of 1-nitroso-2,2,6,6-tetramethylpiperidone-azine-4, having melting-point 208° to 209°C, and the following elemental analysis:

|  | Found | $C_{18}H_{32}N_6O_2$ Requires |
|---|---|---|
| Carbon | 59.21 | 59.30 |
| Hydrogen | 9.09 | 8.80 |
| Nitrogen | 22.84 | 23.00 |

EXAMPLE 2

0.15% weight/volume solutions of various additives in acetone were made up and 40 parts by volume of each of the solutions were added to 40 parts by weight of a powdered polypropylene which was substantially free from stabilising additives. A further 60 parts by volume of acetone was then added to each mixture to form slurries which were hand-mixed to ensure homogeneity. The solvent was then removed from each slurry by evaporation in a rotary evaporator heated by a boiling water bath, the last traces of solvent being removed by passing a slow stream of nitrogen through the evaporator leaving dry powders.

14 grams of dried powder were weighed into a mould measuring 6 × 6 × 0.015 inch. The mould and polishing plate were then heated in a press under contact pressure for 5 minutes. A pressure of 20 tons per square inch was applied for one minute, cooling was commenced and pressure increased so that when the temperatures reached 150°C., the pressure was 80 tons per square inch. Cooling was continued until the temperature of the mould reached 50°C. and the mould was released from the press.

The samples of moulded sheet so obtained were exposed to light irradiation in a device consisting of a circular bank of 28 alternate sunlight and blacklight lamps. The sunlight lamps were 2 feet long 20 watt fluorescent lamps having a peak emission of 3100 Angstrom units and the blacklight lamps were 2 feet long 40 watt ultra-violet lamps having a peak emission of 3500 Angstrom units. The samples were rotated concentrically within the bank of lamps so that the radiation was uniformly distributed over them.

The exposed samples were examined periodically and bent through 180°C. and the time at which each snapped due to embrittlement was noted.

The results achieved are set out in the following Table which also includes data relating to polypropylene containing no additive, or 2-(2'-hydroxy-3',5'-dit-butylphenyl)-5-chlorobenzotriazole or 1-nitroso-2,2,6,6-tetramethyl-piperidone-azine-4, respectively.

TABLE I

| Example | Additive | Time to embrittlement (hours) |
|---|---|---|
| — | none | 59 |
| — | 2-(2'-hydroxy-3',5'-di-t-butylphenyl)-5-chlorobenzotriazole | 127 |
| 2 | 1-nitroso-2,2,6,6-tetramethyl-piperidone-azine-4 | 356 |

These results indicate the improved light stabilising properties of the compound of the invention compared with a known stabiliser.

EXAMPLE 3

A mixture of 3.81 parts of 1-acetyl-2,2,6,6-tetramethyl-piperidone and 0.5 parts of hydrazine hydrate were heated in a steam bath for 4 hours. The resulting solid product was recrystallised from ethanol and dried under vacuum to yield 1.50 parts of 1-acetyl-2,2,6,6-tetramethyl-piperidone azine-4 as a pale yellow powder having a melting point of 242° to 244°C and the following elemental analysis:

|  | Found | C$_{22}$H$_{38}$N$_4$O$_2$ requires |
|---|---|---|
| carbon | 67.88 | 67.65 |
| hydrogen | 9.86 | 9.81 |
| nitrogen | 14.00 | 14.34 |

EXAMPLE 4

38 parts of polypropylene were homogenised with 0.76 parts of n-octadecyl-β-(4$^1$-hydroxy-3$^1$,5$^1$-di-t-butylphenyl) propionate in a kneading machine over a period of 3 minutes, 0.19 Part of 1-acetyl-2,2,6,6-tetramethylpiperidone-azine-4 was then added and homogenisation was continued for a further 7 minutes.

The homogenised mixture was removed from the kneader and pressure to a thickness of 2–3 mm. in a press. 9 parts of the polypropylene mixture were then charged into a press in which the press-plates were protected by 0.1 mm. thick aluminium foil. The press was closed and for 2 minutes no pressure was applied. The pressure was then increased up to a miximum of 12 tons and this pressure held for 6 minutes, the temperature being 260°C. The pressure was released and the material (0.3 mm. thick) was cooled under running water.

This material was cut into 3–5 pieces of 35 × 35 mm. section and recharged to the press. The press was closed and no pressure was applied for 2 minutes. Over another 2 minutes the pressure was increased to 8 tons, the press temperature being 260°C. This pressure was maintained for 2 minutes and then the pressure released. The 0.1 mm. thick polypropylene foil was then removed and tempered immediately in a circulating-air oven maintained at 150°C.

A section measuring 44 × 100 mm. was separated from the 0.1 mm. tempered polypropylene foil and exposed to light irradiation in a fademeter device consisting of a circular bank of 28 alternate sunlight and blacklight lamps. The sunlight lamps were 2 feet long, 20 watt fluorescent lamps characterised by a peak emission of 3000 Angstrom units; the blacklight lamps were 2 feet long, 40 watt ultraviolet lamps characterised by a peak emission of 3500 Angstrom units. The sample was rotated concentrically about the bank of lamps so that the radiation therefrom was uniformly distributed over the section under test.

The exposed sample was examined periodically and the time at which the sample reached 50% of the initial elongation at break was noted.

Light Ageing Test

Table 2

| EXAMPLE | ADDITIVE | TIME TO 50% ELONGATION AT BREAK IN F.S.B. LIGHT AGEING TESTS (HRS) |
|---|---|---|
| − | NONE | 125 |
| + | 1-acetyl-2,2,6,6-tetra methylpiperidone-azine-4 | 155 |

I claim:
1. A compound of the formula

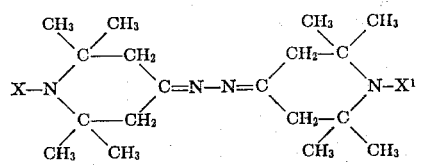

wherein X and X$^1$ are the same or different and represent NO, formyl, acetyl or propionyl.

2. A compound according to claim 1 wherein X and X$^1$ are the same or different and X represents NO or formyl, acetyl or propionyl and X$^1$ represents NO or acetyl or propionyl.

3. A compound according to claim 1 which is

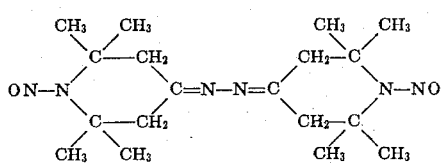

4. A compound according to claim 1 which is

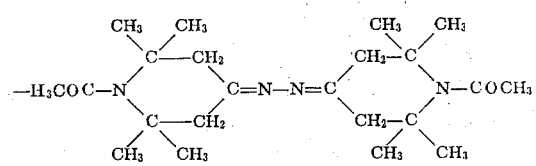

* * * * *